(12) United States Patent
Mauk et al.

(10) Patent No.: US 7,238,416 B2
(45) Date of Patent: Jul. 3, 2007

(54) LINOLEUM-BASED FLOOR COVERING WITH IMPROVED FLAME-RETARDANT PROPERTIES AND A METHOD FOR PRODUCING THE SAME

(75) Inventors: Hanns-Jörg Mauk, Mundelsheim (DE); Milko Ess, Freiberg am Neckar (DE); Karl-Heinz Schwonke, Löchgau (DE)

(73) Assignee: DLW Aktiengesellschaft, Bietigheim-Bissingen (DE)

( * ) Notice: Subject to any disclaimer, the term of this patent is extended or adjusted under 35 U.S.C. 154(b) by 14 days.

(21) Appl. No.: 10/474,417

(22) PCT Filed: Apr. 10, 2002

(86) PCT No.: PCT/EP02/03998

§ 371 (c)(1), (2), (4) Date: Mar. 8, 2004

(87) PCT Pub. No.: WO02/081812

PCT Pub. Date: Oct. 17, 2002

(65) Prior Publication Data

US 2004/0146708 A1    Jul. 29, 2004

(30) Foreign Application Priority Data

Apr. 10, 2001 (DE) .................. 101 17 922

(51) Int. Cl.
*B32B 7/12* (2006.01)

(52) U.S. Cl. ............... 428/317.1; 428/317.3; 428/317.7; 428/317.9; 428/323; 428/343; 427/207.1; 427/243; 427/244

(58) Field of Classification Search ........... 428/317.1, 428/317.3, 317.7, 317.9, 323, 343, 355; 427/207.1, 427/243, 244
See application file for complete search history.

(56) References Cited

U.S. PATENT DOCUMENTS

| | | | | |
|---|---|---|---|---|
| 2,412,303 A | * | 12/1946 | Spitzli et al. | 106/18 |
| 4,265,963 A | * | 5/1981 | Matalon | 442/138 |
| 5,132,171 A | * | 7/1992 | Yoshizawa et al. | 428/317.1 |
| 6,831,023 B1 | * | 12/2004 | Szerreiks et al. | 442/110 |

FOREIGN PATENT DOCUMENTS

| | | |
|---|---|---|
| DE | 199 15 868 A1 | 10/2000 |
| EP | 0 888 859 A1 | 1/1999 |
| GB | 761672 | 11/1956 |

* cited by examiner

*Primary Examiner*—Leszek Kiliman
(74) *Attorney, Agent, or Firm*—Womble Carlyle Sandridge & Rice, PLLC

(57) ABSTRACT

Disclosed is a linoleum-based floor covering with improved flame-retardant properties, whose useful layer contains at least one flame retardant from the group of expandable graphites. Additionally disclosed is a method for producing linoleum-based floor-coverings with structures for creating colored patterns and to a cork-based floor covering with improved flame-retardant properties.

14 Claims, No Drawings

LINOLEUM-BASED FLOOR COVERING WITH IMPROVED FLAME-RETARDANT PROPERTIES AND A METHOD FOR PRODUCING THE SAME

RELATED APPLICATION

This application claims priority under 35 U.S.C. §119(b) to German application serial no. 101 17 922.7-26, filed on Apr. 10, 2001, and PCT application serial no. PCT/EP02/03998, filed on Apr. 10, 2002, under 35 U.S.C. §363.

FIELD OF THE INVENTION

The present invention relates to a floor covering based on linoleum having improved flame retardant properties, which contains at least one flame retardant from the group of expandable graphites in the wear layer, as well as a method of producing floor coverings based on linoleum having novel color pattern textures. Furthermore, the present invention relates to a floor covering based on cork having improved flame retardant properties, which contains at least one flame retardant.

BACKGROUND OF THE INVENTION

Floor coverings based on linoleum and methods for their production have been known for a long time. A disadvantage of the floor coverings based on linoleum known in the related art is, however, the not uncritical burning behavior. Linoleum only achieves the building material class B1 with difficulty (fire testing according to DIN 4102 T14, "Radiant Flooring Panel Test"). In the future, the requirements for floor coverings are to be made more stringent by a new EN standard. For example, currently a linoleum floor covering must achieve a critical radiant intensity of $\geq 4.5$ kW/m$^2$ according to DIN 4102 T14 in order to be classified in the economically important building material class B1. In the event of a future introduction of the new test methods according to EN ISO 9239-1 and EN ISO 11925-2, which are based on the old test DIN 4102 T14, but whose classifications are performed according to prEN 13501-1, floor coverings, particularly linoleum, having a test result of $\geq 4.5$ kW/m$^2$ are no longer rated in B1, but rather in $C_{FL}$. Significant competitive disadvantages may arise from this in relation to other plastic floor coverings, such as PVC. Only at a critical radiant intensity of $\geq 8$ kW/m$^2$ would grading in the economically important building material class $B_{FL}$ be possible. The not uncritical behavior in fire is also a disadvantage of the floor coverings based on cork known in the related art.

SUMMARY OF THE INVENTION

The present invention is therefore based on the object of providing a floor covering based on linoleum which is to have significantly improved behavior in fire in comparison to the linoleum floor coverings known in the related art. A further object of the present invention is to provide a floor covering based on cork which is to have significantly improved behavior in fire in comparison to the cork floor coverings known in the related art.

These objects are achieved by the objects characterized in the claims.

DETAILED DESCRIPTION

In particular, a floor covering based on linoleum is provided, including at least one wear layer made of linoleum, which contains at least one flame retardant, selected from the group of expandable graphites. Expandable graphites such as Nord-Min® 251, Nord-Min® 35, or Nord-Min® KP251, obtainable from NRC Nordmann, Rassmann GmbH & Co., which are characterized briefly in the following Table 1, are especially preferred.

TABLE 1

|  | Nord-Min 251 | Nord-Min 35 | Nord-Min KP251 |
|---|---|---|---|
| Type | Sulfuric acid inclusion compound | Sulfuric acid inclusion compound | Acetic acid inclusion compound |
| Decomposition temperature | Approximately 200° C. | Approximately 200° C. | Approximately 150° C. |
| Expansion volume | At least 250 ml/g | Approximately 35 ml/g | Approximately 250 ml/g |
| Particle size | At least 80% > 0.3 mm | At least 80% < 0.15 mm | At least 80% > 0.3 mm |

Furthermore, besides the at least one flame retardant from the group of expandable graphites, a flame retardant from the group of flame retardants which promote charring, the fire extinguishing flame retardants, such as ammonium phosphate or dipentaerythrite, the flame retardants which form a barrier layer, such as water glass, borates, and ammonium polyphosphates, the intumescence agents, or a mixture containing at least two of these flame retardants may be present in the wear layer. In this case, the intumescence agents may be selected from the group including urea and/or its derivatives, dicyandiamide, melamine, ammonium polyphosphates, organic phosphates, and mixtures thereof. Inorganic compounds, such as aluminum hydroxides, e.g., Al(OH)$_3$, and borates, halogenated organic compounds, such as chlorinated paraffins, organic phosphor compounds, particularly phosphates, phosphites, and phosphonates, and halogenated organic phosphor compounds may also be used as flame retardants in the linoleum wear layer, besides the at least one flame retardant from the group of expandable graphites. The additionally used flame retardants may be provided in the linoleum wear layer singly or as a mixture containing at least two of these flame retardants (from the same or different groups listed above).

The flame retardant used according to the present invention in the wear layer preferably has an expansion volume of at least 30 ml/g. The proportion of flame retardant in the wear layer made of linoleum is preferably up to 40 weight-percent, more preferably from 0.1 to 20 weight-percent, in relation to the quantity of the wear layer.

Furthermore, the wear layer made of linoleum includes typical components, such as binders (so-called Bedford cement or B cement made of partially oxidized linseed oil and at least one resin as a tackifier), at least one filler, and possibly at least one coloring agent. Typically soft wood flour and/or cork flour (if wood flour and cork flour are present simultaneously, they are typically in the weight ratio 90:10) and/or chalk, kaolin (China clay), and heavy spar are used as fillers. The linoleum mixed compound typically contains at least one coloring agent, such as a pigment (e.g., titanium dioxide), and/or other typical coloring agents based on inorganic and organic dyes. Any natural or synthetic dyes as well as inorganic or organic pigments, alone or in any arbitrary combination, may be used as the coloring agents.

A typical linoleum composition contains, in relation to the weight of the wear layer, approximately 40 weight-percent binder, approximately 30 weight-percent organic materials, approximately 20 weight-percent inorganic (mineral) fillers, and approximately 10 weight-percent coloring agents. Furthermore, typical additives, such as processing aids, antioxidants, UV stabilizers, lubricants, and the like, which are selected as a function of the binder, may be contained in the linoleum mixed compound.

Furthermore, the floor covering based on linoleum according to the present invention may also be implemented as electrically conductive by adding at least one derivative of imidazole, imidazoline, benzimidazole, or morpholine, or a cationic compound (cf. German Patent 34 16 573 and WO 99/10592) and/or by positioning a layer based on linoleum which contains at least one electrically conductive filler, such as carbon black or metal powder, under the linoleum wear layer. Of course, an electrically conductive layer of this type may also contain one or more of the flame retardants cited above.

The linoleum wear and/or upper layer preferably has a thickness of 0.9 to 6.0 mm, especially preferably 1.4 to 4 mm. In the scope of the present invention, the wear layer is understood as the uppermost layer of the floor covering, made of a homogeneous material.

The floor covering based on linoleum according to the present invention may be carrierless (cf. German Patent Application 199 10 389 A1) or may include a carrier. A material based on natural or synthetic woven or knitted fabrics as well as textile materials may be used as the carrier material. Examples of these are jute fabrics, mixed fabrics made of natural fibers such as cotton and cellulose, fiberglass fabrics, glass fiber fabrics coated with bonding agents, mixed fabrics made of synthetic fibers, and fabrics made of core/sheath fibers having a core made of polyester and a sheath made of polyamide, for example. For example, a coating of the glass fibers made of a styrene-butadiene latex may be used as the bonding agent for glass fiber fabrics.

The floor covering according to the present invention may be implemented with or without a carrier, the linoleum wear layer able to be designed as single-layer or multilayered. In this case, both symmetrical and asymmetrical planar formations result depending on the layer sequence, symmetrical constructions being preferred for carrierless linoleum planar formations. For example, the floor covering according to the present invention may include two layers made of linoleum (materially homogeneous), which may be identical or different.

Furthermore, a corkment layer with or without a carrier may be positioned under the linoleum wear layer. Corkment is a mixture which contains Bedford cement and ground cork as a filler and ensures better thermal insulation, tread elasticity, and walking comfort and dampens tread and room noise as an insulating underlayer for floor coverings. A corkment layer of this type may also include one or more of the flame retardants cited above.

In addition, functional layers may also be positioned under or between two linoleum layers, so that three-layer or multilayered planar formations result. For example, at least one further layer, preferably a foam layer, a layer for tread noise damping, and/or an insulation layer may be positioned under the wear layer of the floor covering according to the present invention. The layer thicknesses of the layers applied may be identical or different. All of these functional layers positioned under or between two linoleum layers may each also contain one or more of the flame retardants cited above.

Furthermore, at least one adhesive layer may be positioned on the back of the floor covering according to the present invention without a carrier.

The floor covering based on linoleum according to the present invention may be provided in the form of webs or tiles.

The floor covering based on linoleum according to the present invention may also be produced through typical methods for producing single-layer or multilayered linoleum floor coverings with or without a carrier.

To generate a color pattern, such as a Jaspé texture (lengthwise texture on the calender) or a marble-like texture, however, admixing different colored mixed compounds, which must be produced in different work steps, is typically necessary. These work steps are both costly and time-consuming.

The present invention is therefore based on the further object of providing a method for generating color patterns, such as Jaspé-like textures or marble-like textures, of linoleum floor coverings, which is to be more cost-effective, faster, and preferably also novel while maintaining the required quality.

This object is achieved by providing a method for producing at least one floor covering based on linoleum, the floor covering containing at least one wear layer made of linoleum, which contains at least one expandable graphite as the flame retardant, in which the linoleum mixed compound is supplied to a scraper and subsequently processed into rough sheets using calenders or rolling mills, the expandable graphite contained in the linoleum mixed compound being non-uniformly digested in the scraper to obtain multicolored mixed compound particles, which results in Jaspé-like textures upon a subsequent calendering or rolling.

The single rough sheets having Jaspe-like textures obtained in this way may also each be rotated by 90° and laid on top of one another like scales. A marble-like look having an especially plastic impression may thus be obtained from Jaspé-like textures through renewed calendering, since the graphite is digested differently and a cloud-like structure arises in this way.

Furthermore, multicolored chips, which may subsequently be calendered, may be produced through methods known in the related art from the "Jaspé planar formation" and a non-oriented texture may thus be produced.

In this case, the concept "multicolored" especially refers to the occurrence of different gray tones.

This method of the present invention surprisingly allows the patterning of linoleum wear and/or upper layers of planar formations produced in this way in one step. For example, using this method, in addition to the Jaspé or marble-like patterning, a metallic glitter effect of the planar formation may be achieved simultaneously. Furthermore, problems, such as Theological problems, which arise if multiple differently colored particles are used to generate Jaspe-like textures, may be avoided. Of course, the linoleum floor covering produced using this method also has the outstanding flame retardant properties described above due to the presence of the expandable graphite.

The present invention also relates to a floor covering based on cork which contains at least one of the flame retardants defined above. The flame retardant used in such a floor covering based on cork is not subject to any special restriction and, for example, the flame retardants known in the related art from the group of flame retardants which promote charring, the fire extinguishing flame retardants, such as ammonium phosphate or dipentaerythrite, the flame retardants which form a barrier layer, such as water glass, borates, and ammonium polyphosphates, and the flame retardants which form a damping layer and/or the intumescence agents may be used in the cork wear layer. Inorganic compounds, such as aluminum hydroxides, e.g., $Al(OH)_3$, and borates, halogenated organic compounds, such as chlorinated paraffins, organic phosphor compounds, particularly phosphates, phosphites, and phosphonates, and halogenated organic phosphor compounds may also be used as flame retardants in the cork wear layer, for example. The flame retardants used according to the present invention may be provided in the cork wear layer singly or as a mixture containing at least two of these flame retardants (from identical or different groups listed above). In a preferred embodiment of the cork floor covering according to the present invention, the flame retardant is an intumescence agent. The intumescence agent is preferably selected from the group of expandable graphites, urea and/or its derivatives, dicyandiamide, melamine, ammonium polyphosphates, and organic phosphates. A mixture of at least two of these intumescence agents or, for example, at least one intumescence agent and at least one flame retardant from another group listed above, for example, may also be used in the cork wear layer. An expandable graphite such as Nord-Min® 251, Nord-Min® 35, or Nord-Min® KP251, obtainable from NRC Nordmann, Rassmann GmbH & Co., is especially preferred.

To produce a cork floor covering of this type according to the present invention, typically cork granulate of a specific grain size distribution and residual moisture (preferably 1.5-3.0%) is mixed with melamine formaldehyde resin as a binder and, for example, expandable graphite as the flame retardant used according to the present invention and a typical cross-linking catalyst, the proportion of binder typically being 10-30 weight-percent in this case, since a part of the binder is bound by the flame retardant additives. This mixture is poured into thick-walled steel molds (exemplary dimensions: width 700 mm, length 1,000 mm, height 800 mm) and compressed (preferably 10-200 tons). The cross-linking is performed at 110-135° C. within 8 to 22 hours, for example. The blocks manufactured in this way from cork granulate (having a residual height of 100-300 mm, for example, depending on the degree of compression/pressure) are then cut/peeled into individual slabs using a band cutting facility. The slab thickness may be between 1 and 10 mm, for example. In order to achieve a smooth surface with sharp contours, the slabs are typically ground and calibrated using a belt sanding machine. The top is preferably ground using 3 to 6 grinding passes in this case, initially using a coarse abrasive grit and finally using a fine abrasive grit (for example, 1=40 grit, 2=80 grit, 3=120 grit, 4=180 grit, 5=220 grit, 6=360 grit). The bottom is only ground using 1-2 grinding passes, for example, using 24 and 40 grit. The slabs may subsequently be equipped with a surface protection. This may be performed using a PVC clear film (K value 60 or 80), a lacquer (PPG or Lott co's), or wax (e.g., solid floor wax, Loba co., Ditzingen, Germany), for example. Subsequently, tile-shaped slabs may be stamped out of the coated slabs and the edges may possibly be cleaned up using a cutter. The cork slabs manufactured in this way achieve, according to EN ISO 9239-1, a critical radiation intensity of more than 8 $kW/m^2$ and a flame progression of less than 150 mm within 20 seconds, which corresponds to a classification according to prEN 13501-1:1999 of $B_{FL}$. Surprisingly, a new patterning possibility results if expandable graphite is used as the flame retardant used according to the present invention, for example, since the mica-like graphite particles reflect the light in such a way that a mineral or metallic effect result.

The present invention and further advantages resulting therefrom are described in greater detail in the following description with reference to the embodiments described in the examples and comparative examples.

EXAMPLES

Linoleum Floor Covering

Samples were produced with and without expendable graphite. For this purpose, first all of the components for the linoleum compound listed in the following Table 2 were mixed in a kneader into a basic compound (mixed compound) which was as homogeneous as possible. The mixed compound obtained in this way was processed by rolling mill into rough sheets and supplied to a scraper, after which the differently colored mixed compound particles thus obtained were supplied to a calender and compressed on jute as a carrier material under pressure and at a temperature typically from 10 to 150° C. The band speed was 10 m/minute.

In the following Table 2, recipes according to the present invention and a comparative example are listed in weight-percent, in relation to the quantity of the total mixture. Furthermore, still further material properties of the linoleum compound and/or of the linoleum covering are listed in Table 2. The flame retardants listed in the following Table 2 may be used individually or in combination of two or more thereof in the particular recipes in this case.

TABLE 2

|  |  | Preferred range | Especially preferred range | Standard linoleum (comparative example) |
|---|---|---|---|---|
| Cement | [%] | 20–70 | 30–55 | 30–55 |
| Cork flour | [%] | 0–60 | 2–25 | 2–25 |
| Wood flour | [%] | 0–70 | 5–45 | 5–45 |
| Chalk | [%] | 0–75 | 5–60 | 5–60 |
| Titanium dioxide | [%] | 0–15 | 1–10 | 1–10 |
| Colored pigments | [%] | 0–10 | 0–5 | 0–5 |
| Nord-Min 250 ® | [%] | 0.01–30 | 1–20 | — |
| Nord-Min KP251 ® | [%] | 0.01–30 | 1–20 | — |
| Budit 3076 DC ® (Goldmann co.) | [%] | 0.01–30 | 1–20 | — |
| ATH M20B ® (Alcoa co.) | [%] | 0.01–30 | 1–20 | — |
| MFI 60° C. (60 sec.) | [ml] | 0.5–25 | 1–20 | 1–20 |
| Thickness | [mm] | 1.0–4.0 | 2.0–4.0 | 2.0–4.0 |
| Index | [%] | 23–32 | 26–30 | 26–30 |
| Elasticity | [%] | 58–75 | 60–70 | 60–70 |
| Residual impression | [%] | 4–15 | 5–10 | 5–10 |
| Curing time | [days] | 5–40 | 6–20 | 6–20 |
| Finishes | [µm] | 2–20 | 4–15 | 4–15 |
| Test results according to EN ISO 9239-1 unglued | radiant intensity $kW/m^2$ | 8.0–11.6 | 8.3–11.2 | 4.5–6.5 |

This recipes listed in Table 2 and/or the linoleum floor coverings according to the present invention produced therefrom displayed drastically improved flame retardant properties in comparison to a typical linoleum floor covering without flame retardants with properties which otherwise remained essentially the same.

Cork Floor Covering

Cork floor coverings were produced as described above. In the following Table 3, recipes according to the present invention are listed in weight-percent, in relation to the quantity of the total mixture. Furthermore, still further material properties of the cork compound and/or of the cork floor covering are listed in Table 3. The flame retardants listed in the following Table 3 may again be used in the particular recipes singly or in combination of two or more thereof in this case.

TABLE 3

|  |  | Preferred range | Especially preferred range |
|---|---|---|---|
| Melamine | [%] | 1–20 | 2–15 |
| Formaldehyde | [%] | 1–30 | 2–20 |
| Ammonium chloride | [%] | 0.01–4 | 0.02–2 |
| Nord-Min 250 ® | [%] | 0.01–30 | 1–20 |
| Nord-Min KP251 ® | [%] | 0.01–30 | 1–20 |
| Budit 3076 DC ® (Goldmann co.) | [%] | 0.01–30 | 1–20 |
| ATH M20B ® (Alcoa co.) | [%] | 0.01–30 | 1–20 |
| Wetting agent (or surface-active agent) Ethoxyl-group based | [%] | 0.01–2 | 0.05–1.5 |
| Spray technique on cork granulate in mixer, in batches | | | |
| Spray pressure nozzle | [bar] | 3–200 | 6–50 |
| Cork granulate | [mm] | 50–90 | 60–88 |
| Residual moisture cork | [%] | 1.5–3.0 | 1.8–2.5 |
| Pressure cross-linking | [kg/cm$^2$] | 0.5–40 | 1–30 |
| temperature | [mm] | 80–250 | 100–220 |
| cross-linking time | (h) | 0.1–24 | 0.2–18 |
| cork density | kg/l | 0.3–0.9 | 0.4–0.8 |
| Conditioning using water steam and, for example, seasoning 24 hours at 20° C. | | | |
| Finishes | [μm] | 2–300 | 10–150 |
| Test results according to EN ISO 9239-1 unglued | radiant intensity kW/m$^2$ | 8.0–11.6 | 8.3–11.2 |

Cork floor coverings of this type according to the present invention display significantly improved flame retardant properties.

The invention claimed is:

1. A linoleum based floor covering comprising: at least one wear layer made of linoleum including at least one flame retardant comprising an expandable graphite.

2. The floor covering according to claim 1, wherein the at least one flame retardant comprises an agent selected from a chaffing promoting agent, a fire-extinguishing agent, an agent which forms a baffler layer, an intumescence agent, or a mixture thereof.

3. The floor covering according to claim 2, wherein the intumescence agent is selected from urea and/or its derivatives, dicyandiamide, melamine, ammonium polyphosphates, organic phosphates, or mixtures thereof.

4. The floor covering according to claim 1, wherein the proportion of flame retardant in the wear layer made of linoleum is up to 40 weight-percent in relation to the quantity of the wear layer.

5. A method of producing a linoleum based floor covering having a Jaspé-like structure, comprising: supplying a linoleum mixed compound comprising an expandable graphite to a scraper and subsequently processing the mixed compound into rough sheets, wherein the expandable graphite contained in the linoleum mixed compound is non-uniformly digested in the scraper to obtain multicolored mixed compound particles and granulates of different grayscales to provide Jaspé-like textures upon a subsequent calendering or rolling.

6. The method according to claim 5, wherein the Jaspé planar formations obtained are each rotated by 90° and laid one on top of another like scales, and this construct is subsequently calendered to obtain rough sheets having marble-like textures.

7. The method according to claim 5, wherein multicolored chips are produced from the Jaspé planar formations obtained, which are subsequently calendered to obtain rough sheets having a non-oriented texture.

8. A floor covering based on cork comprising at least one flame retardant.

9. The floor covering according to claim 8, wherein the, at least one flame retardant comprises an agent selected from a charring promoting agent, a fire-extinguishing agent, an agent which forms a barrier layer, an intumescence agent, or a mixture thereof.

10. The floor covering according to claim 8, wherein the intumescence agent is selected from expandable graphites, urea and/or its derivatives, dicyandiamide, melamine, ammonium polyphosphates, organic phosphates, mixtures containing at least two of these intumescence agents, or mixtures containing at least one of these intumescence agents and at least one other flame retardant.

11. The floor covering according to claim 8, wherein the flame retardant is an expandable graphite.

12. The floor covering according to claim 9, wherein the intumescence agent is provided in a quantity of up to 40 weight-percent, in relation to the quantity of the wear layer.

13. The floor covering according to claim 1, wherein the proportion of flame retardant in the wear layer made of linoleum is from 0.1 to 20 weight-percent in relation to the quantity of the wear layer.

14. The method of claim 5, whereby the mixed compound is processed into rough sheets using calendars or rolling mills.

* * * * *